United States Patent [19]

Barnes

[11] 3,848,367
[45] Nov. 19, 1974

[54] ANCHOR DEVICE FOR TRAILERS

[76] Inventor: Ray A. Barnes, 1057 Patricia, Cape Girardeau, Mo. 63701

[22] Filed: May 3, 1972

[21] Appl. No.: 249,828

Related U.S. Application Data

[63] Continuation-in-part of Ser. No. 83,309, Oct. 23, 1970, Pat. No. 3,691,703.

[52] U.S. Cl. ..................................... 52/157, 52/23
[51] Int. Cl. ............................................ E04h 12/20
[58] Field of Search ....... 52/23, 170, 150, 151, 161, 52/295, 173, 3–5, 149, 157; 24/269; 248/74 B, 361 A, 119 R; 151/34, 55, 54; 242/74, 85; 161/142, 216, 213; 74/237

[56] References Cited
UNITED STATES PATENTS

| | | | |
|---|---|---|---|
| 257,192 | 6/1882 | Tatro | 74/237 |
| 1,759,596 | 6/1930 | Steudte | 242/107.2 |
| 2,357,368 | 9/1944 | Warren | 52/161 |
| 2,612,911 | 10/1952 | Usry | 151/54 |
| 2,748,044 | 6/1956 | Seiler | 74/237 |
| 3,054,151 | 9/1962 | Shankland | 52/146 |
| 3,416,763 | 12/1968 | Moreno | 254/161 |
| 3,697,045 | 10/1972 | Farley | 248/361 A |
| 3,747,288 | 7/1973 | Grimelii | 52/23 |

Primary Examiner—Henry C. Sutherland
Attorney, Agent, or Firm—Jones, Tullar & Cooper

[57] ABSTRACT

An anchor device for securing trailers such as mobile homes, travel trailers, and other such vehicles to ground is disclosed. The anchor device includes a plastic belt-like member reinforced with a plurality of steel bands, the belt being of sufficient length to wrap around the outside of the trailer or vehicle. The ends of the belt are secured to the ground by means of a yoke-shaped ground anchor which is embedded in the ground beneath the vehicle. The ground anchor has a spiral wing blade or helix secured to its shaft so that the anchor may be rotated into the ground and, once embedded, cannot readily be pulled out by exerting force along the axis of the shaft. A steel rod bridges the span of the yoke and the belt is secured to and wound around the rod until the band is pulled flush against the sides and top of the trailer. The rod is then locked in the final position to prevent the straps from unwinding and the trailer is securely anchored to the ground.

1 Claim, 6 Drawing Figures

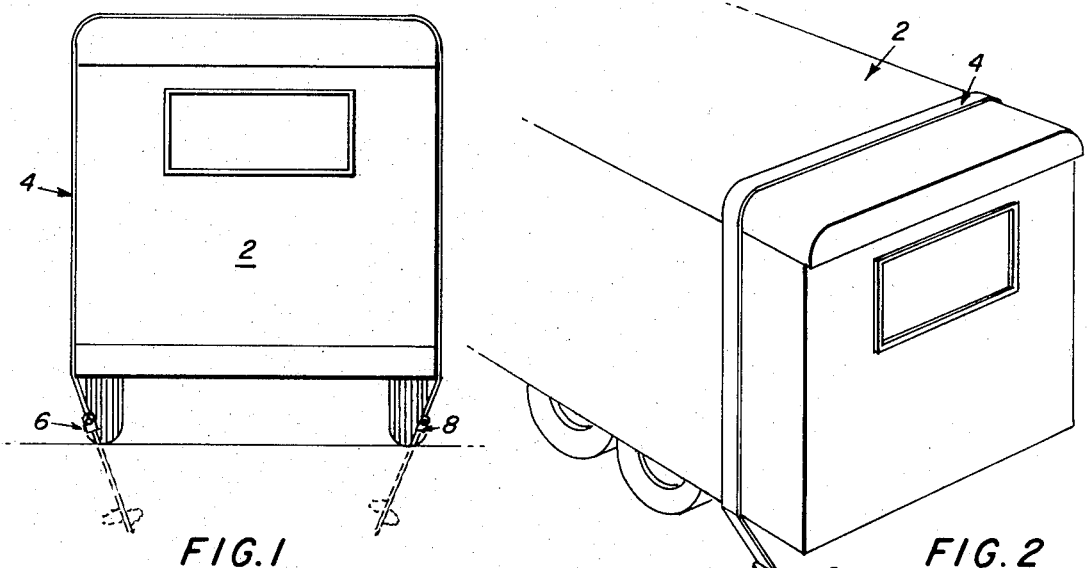
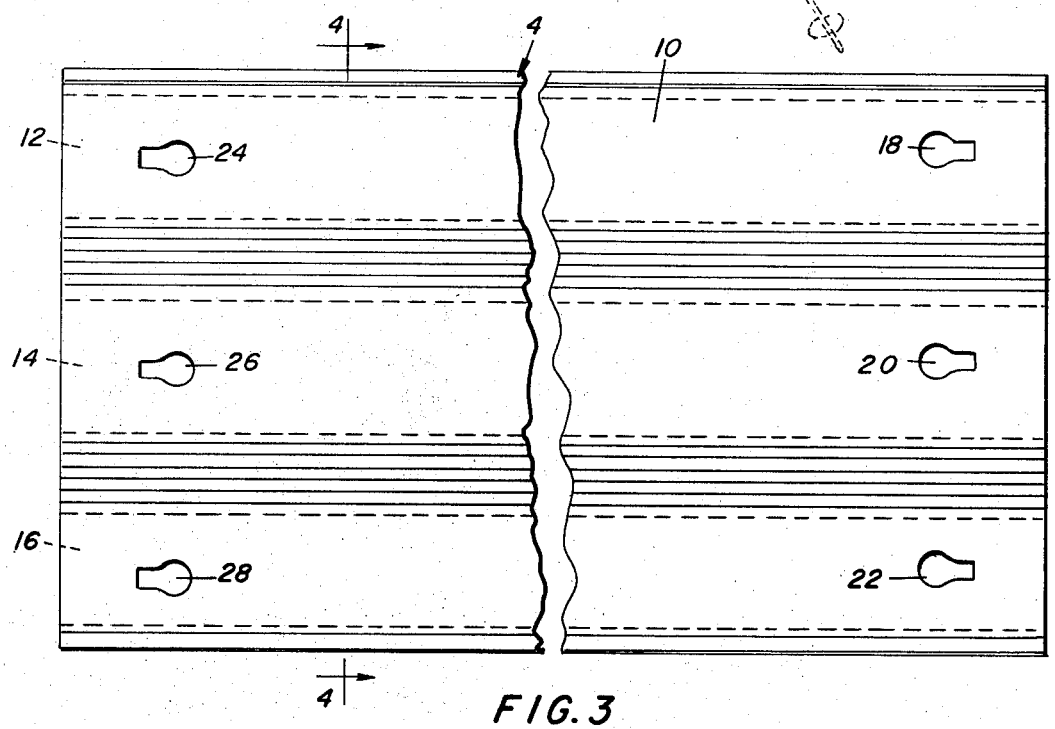
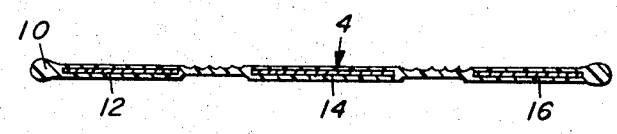

ANCHOR DEVICE FOR TRAILERS

The present invention is a continuation-in-part of application Ser. No. 83,309, filed Oct. 23, 1970 now U.S. Pat. No. 3,691,703 and relates, in general, to improvements in anchoring devices for trailers, and more particularly, to a novel arrangement for lashing a mobile home, travel trailer, or the like to prevent it from being rocked, moved, or otherwise disturbed under severe weather conditions involving high velocity winds.

BACKGROUND OF THE INVENTION

With the increasing mobility of people in this country, due in part to the proliferation of highways and in part to increased leasure time, the use of travel trailers and mobile homes has greatly increased. A further increase in the use of mobile homes is due to the rapidly increasing costs of building and owning a home, and many have found it economically advantageous to utilize mobile homes for their permanent residence. A general complaint about such arrangements, however, is that trailers, being mounted on spring supported axles and wheels, are subject to a considerable amount of rocking and moving about during windy conditions, making these living arrangements somewhat uncomfortable.

Where a mobile home is to be used in a permanent location, some of the foregoing difficulties can be overcome by placing the home on a permanent foundation, but even in such a case, the relatively light weight of these trailers can result in severe damage in a high wind. The use of wheel blocks and the like may permit a trailer to remain stationary in its parking place under most conditions, but such arrangements do not secure the trailer to the ground.

In order to prevent trailers from being damaged or destroyed by weather conditions, means must be provided to insure proper anchorage. Various attempts have been made to accomplish this purpose in the prior art, but many of these prior devices have been found difficult to use and install because of their complexity. Other anchoring devices fail to provide the required support, or in order to obtain sufficient stability, must extend a considerable distance from the base of the trailer, and thus are themselves a danger, as well as being unsightly. Further, the prior art arrangements are unsatisfactory because they generally provide only a limited number of contact points between the support members and the trailer, and in severe conditions the contact points can bend the trailer wall, thus loosening the trailer in its anchor and allowing damaging movement. The rods or bars used in such prior devices then may be brought forcefully into contact with the trailer wall, and the narrow contact area thus presented can cause the bars to cut through the wall, severely damaging the trailer and its contents.

In cases of more permanent placement of a trailer, it has been proposed to embed steel anchoring devices within a concrete slab. The trailer may then be moved onto the slab and, by various known attachments, the trailer secured to the ground anchors. However, such arrangements are not entirely satisfactory for often it becomes necessary or desirable to replace a trailer with one of a different size, and it has been found that seldom are anchoring devices properly placed so as to be serviceable for more than a very limited number of trailers. The anchorage placement should be selected independently for each trailer in order to insure maximum safety. Flexibility and versatility are essential to a trailer anchoring arrangement, and the prior art has failed to provide this.

SUMMARY OF THE INVENTION

It is, therefore, an object of the present invention to provide a simple and inexpensive way of protecting and stabilizing parked trailers such as mobile homes or travel trailers from damage due to high winds and other serious weather conditions.

Another object of the present invention is to provide a mobile home anchor which is unobtrusive, easy to handle and install, and which provides firm lateral support to the trailer while eliminating the hazards of prior devices.

Another object of the invention is to provide a ground anchoring device having the flexibility of more temporary anchoring devices and the stability of the more permanant anchoring systems.

Briefly, the present invention accomplishes these and other objects by providing wide, flat belts or webs which are secured to a preferred ground anchor having a tension adjusting arrangement so that the belts may be tightened until they firmly abut the trailer structure. More specifically, the belts may be composed, for example, of a 4 inch wide polyvinyl chloride belt reinforced with three or four steel bands, each seven-eighths inch wide. Such a belt may provide a tensile strength of over 6,600 pounds and will not rust or corrode even in the presence of salt water spray. This belt may be passed over the outside of the trailer and secured at each end on opposite sides of the trailer to a tension adjusting ground anchor. The ground anchor preferably includes a yoke-like member and a rotatable steel bar which spans the yoke so that the belt may be secured to and wrapped around the steel bar member. The head of the steel bar is formed in a hexagonal or other standard manner which permits grasping of the head by a wrench, vice grips, or other suitable mechanical means. By rotating the steel bar, the belt is tightened so that it snugly contacts the trailer and a locking device is provided on the yoke to maintain the belt in the tightened position.

BRIEF DESCRIPTION OF THE DRAWINGS

The foregoing and additional objects, features and advantages of the invention will be apparent from the following description, taken in condjunction with the accompanying drawings, in which:

FIG. 1 is a diagrammatic end view of a mobile home supported by the anchoring devices of the present invention;

FIG. 2 is a partial perspective view of the mobil home of FIG. 1;

FIG. 3 is a front elevation of the belt device in accordance with the present invention;

FIG. 4 is a cross sectional view of the belt shown in FIG. 3, taken along line 4—4 thereof;

DESCRIPTION OF THE PREFERRED EMBODIMENT

Figure 5:
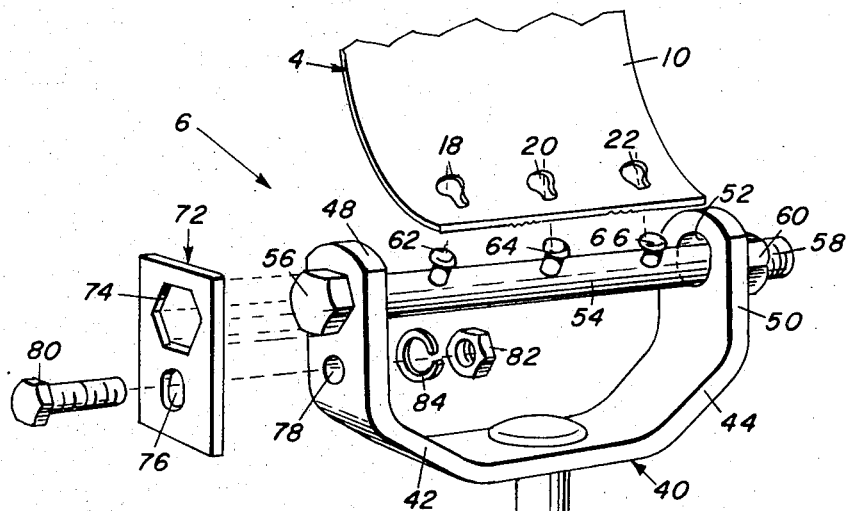
FIG. 5 is an exploded isometric view of the ground anchor device in accordance with the present invention.

Referring now to the drawings wherein like numerals represent similar parts in each figure, and more particularly to the diagrammatic showing of FIGS. 1 and 2, numeral 2 indicates in general a mobile home, travel trailer, or other similar vehicle which requires an anchoring device to provide stability. The trailer is shown mounted on spring-supported wheels although it would be obvious that more permanent mounting would require the utilization of mounting blocks or other similar devices. Belt or web 4 is shown to be snugly passed over the outside of the trailer and secured at each end to respective ground anchors 6 and 8 located below and slightly inside the peripheral edges of the trailer so that the web will be held tightly against the trailer surface. The ground anchors 6 and 8 are shown embedded in the soil at an angle of approximately 40° from the vertical, the exact angle depending upon the distance of the anchors inside the periphery of the trailer and the clearance of the trailer above the ground. It will be seen from FIG. 1 that the flexible belt 4 will abut against and substantially conform to the shape of the top and sides of the vehicle, with the axis of the anchor preferably being aligned with the web where the web extends below the vehicle. The utilization of a wide flexible belt in this manner will reduce the pressure at any given location under the belt by distributing the tension on the belt due to wind loads over a substantial surface of the vehicle, thus reducing the chances of damaging the trailer, and preventing cutting of the trailer skin if the trailer should work loose in a very high wind.

The construction of the belt 4 is shown more clearly in FIGS. 3 and 4, and is also described in my copending application Ser. No. 83,309, filed Oct. 23, 1970, entitled "Anchor Device for Trailers." As shown, the belt is formed from a polyvinyl chloride material designated by numeral 10. The use of a relatively wide polyvinyl chloride belt, which is preferably about 4 inches wide, provides a surface which is resistant to slippage and which distributes any load over a wide surface area, and thus considerably more beneficial than cord or cable which would not present as high a coefficient of friction and which would tend to concentrate forces over a narrow surface area. It has been found that cables tend to deform the surface skin of a trailer, and thus will quickly work loose in a storm, allowing movement of the trailer which can cause the cable to cut through the trailer walls. The disclosed belt prevents such damage, and in addition provides a more pleasing appearance than the metallic or wooden anchoring structures of the prior art.

A plurality of steel bands 12, 14, 16, each approximately seven-eighths inch wide, are embedded in the polyvinyl chloride material to reinforce the belt. These bands give the belt a tensile strength of over 6,600 pounds, allowing trailers secured by it to withstand winds over 100 mph without damage. Each end of the belt 4 is provided with a plurality of eyelets 18, 20, 22 and 24, 26, 28, respectively, the eyelets being located in the ends of the steel bands so that each belt has an eyelet at each end, e.g., eyelets 18 and 24 are formed in band 12, and so on. Steel bands 12, 14, 16 are held in spaced relationship by the polyvinyl chloride material 10, which maintains a flexibility between the individual steel bands, while preventing them from becoming misaligned. A belt constructed in this manner will not be subject to rust and corrosion, and since the steel bands 14 and 16 are embedded within the polyvinyl chloride material 10, the entire belt structure 4 will not harm the exterior of the trailer with which it is in contact.

Figure 6:
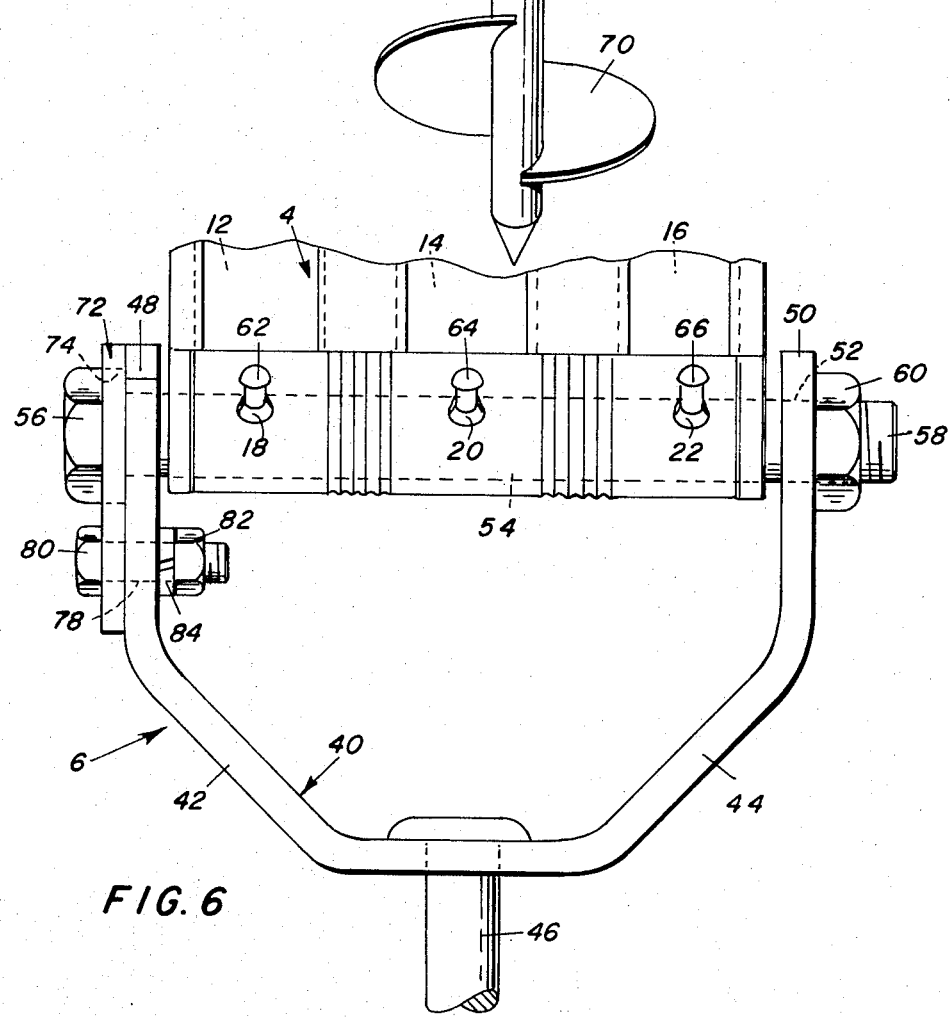
FIG. 6 is a partial elevational view of the ground anchor of FIG. 5.

The preferred embodiment of the ground anchoring device, to which the belt 4 is connected, is shown. These Figures show in an exploded view of ground anchor 6, although it will be obvious that ground anchor 8 is constructed in the same manner. As shown FIGS. 5 and 6, the anchor comprises a generally Y-shaped yoke 40 having first and second upstanding, spaced arms 42 and 44 secured to a depending leg or shaft portion 46. The leg portions 42 and 44 are generally curved or angled to provide parallel spaced upper arm portions 48 and 50 each having a suitable opening or aperture such as that indicated at 52 for receiving a bar 54 which spans the yoke. Bar 54 is freely rotatable within the yoke apertures, and is provided at one end with a hexagonal head 56 and at the other end with a threaded portion 58 adapted to receive a conventional nut 60. A plurality of rivet pins 62, 64 and 66 are spaced along the length of bar 54 within the span defined by arm portions 48 and 50 and are aligned to receive corresponding ones of the eyelets 18, 20 and 22 formed in belt 4. The rivet pins are secured to bar 54 in any suitable manner, and are provided with enlarged heads which are spaced from the bar a distance approximating the thickness of the web, the heads being sufficiently small to pass through the enlarged portions of the eyelets and sufficiently large to prevent the narrow portion of the eyelet openings from slipping off the pins.

The shaft portion 46 of the yoke is welded or otherwise secured to arms 42 and 44 and carries near its lower end a spiral wing blade, or helix, 70 which may be formed as a part of the shaft or secured thereto as by welding. Helic 70 performs two functions; the first is to facilitate placing the anchor in the ground, for the helix acts as a screw thread wehreby the anchor may be rotated and thus screwed into the ground at a desired location. The second function of the helix is to prevent shaft 46 from being drawn out of the ground by an axial force exerted, for example, by web 4 when a strong wind blows against the side of the trailer. It will be noted that by placing the shaft 46 at an angle in the manner illustrated in FIG. 1, any force exerted by the belt 4 will be in an axial direction and will tend to hold the trailer in position. The anchor shaft may, of course, be positioned vertically in the ground immediately below the edge of the trailer, but in such a case, horizontal pressure on the trailer caused by wind will exert a bending force on shaft 46, rather than an axial force, and this may allow the trailer to shift.

A locking means is provided for bar 54 to enable it to be locked against rotation, the locking means comprising a locking plate 72 having a hexagonal opening 74 which is adapted to tightly receive the hexagonal head 56 of bar 54. Spaced below opening 74 is a second aperture 76 in the locking plate which is adapted to be aligned with a corresponding aperture 78 in the upstanding arm portion 48 of yoke 40. When the locking plate is positioned over the head 56, bar 54 may be rotated so that the apertures 76 and 78 are aligned, at which time a bolt 80 may be inserted through these apertures and secured as by a nut 82 and lock washer 84.

In utilizing the anchor assembly of the present invention, a pair of anchors 6 and 8 are first secured in the ground beneath and on opposite sides of the vehicle that is to be secured, the exact location and angle of each anchor depending upon the dimensions of the trailer. A plurality of pairs of anchors may be spaced along the length of the trailer, as required. A strap 4 is then positioned over the trailer for each pair of anchors and the ends are secured thereto. This is accomplished by slipping the eyelets on one end of the belt over the rivet pins of the corresponding anchor and then rotating bar 54 by means of a suitable wrench or the like to wrap a portion of the belt around bar 54. The nut 60 may then be tightened against the yoke arms to hold the shaft temporarily in place, and the locking plate 72 may then be positioned over head 56, the holes 76 and 78 aligned by further rotation of shaft 54 as necessary, and the locking plate secured by bolt 80. It will be apparent that if the locking plate 72 is made thinner than head 56, the head will extend out of the plate, and the shaft 54 and the locking plate 72 may be rotated together by applying a wrench to head 56.

The opposite end of the web is then secured to the second of the pair of anchor devices in the same manner, with the spanning bar 54 of the second anchor being rotated sufficiently to pull web 4 down tightly against the trailer. The anchor plate is then positioned and secured in the manner described, and the installation is complete. This operation is repeated for each of the straps to be positioned on the vehicle, thereby safely securing it against damage.

As was described in my aforesaid copending application, the securing belts 4 may, if desired, be included as an integral part of the trailer structure, being installed within the outer skin of the trailer and secured to the frame thereof so that only the ends of the belt extend to the exterior of the trailer. These ends may be formed with eyelets in the manner described herein, and by proper location of the anchoring devices trailers so equipped may easily be secured. The advantage of the present anchoring device in such a case is apparent, for it permits placement of the trailer prior to location of the anchoring devices, and permits accurate positioning of the anchors with respect to the securing belts. Thus, there has been described and illustrated an improved anchoring device for trailers such as mobile homes, travel trailers and the like, which will firmly hold the vehicle in place even in the face of severe wind conditions. Although specific embodiments of the invention have been shown and described in detail, various modifications will be apparent to those of ordinary skill in the art without departing from the true spirit and scope of the invention as described in the following claims.

What is claimed is:

1. An anchoring system for receiving and holding the ends of a belt to secure a trailer at a selected location and to protect it against damage, comprising:

a belt consisting of an elongated web formed from a plurality of steel bands embedded in space side-by-side relationship in a wide, flat plastic covering, said plastic covering protecting said bands and providing a slip-resistant surface, said belt being adapted to pass over said trailer;

first and second connecting means on respective first and second ends of said belt, said first connecting means comprising a plurality of apertures at said first end of said belt and including one aperture adjacent the end of and passing through a corresponding one of each of said steel bands;

first and second ground anchor means for location on opposite sides of said trailer;

fastening means on each said anchor to cooperate with a corresponding one of said first and second connecting means to secure the first end of said belt to said first anchor means and the second end of said belt to said second anchor means, whereby said belt may be secured to one anchor means, pass over said trailer and be secured to the other anchor means, at least one of said ground anchor means including a generally Y-shaped yoke having first and second upstanding, spaced arms secured to a depending leg, said fastening means on said at least one anchor means including a bar member spanning said yoke, the ends of said bar passing through and being rotatable in first and second apertures located in said first and second arm;

pin means on said bar member for engaging said plurality of apertures on said first end of said belt to connect the end of said belt to said bar member;

means including a shaped head on said bar member for rotating said bar to wind said belt around said bar and to place said belt in tension;

locking means for said bar comprising a locking plate having a first opening shaped to receive snugly and without rotation said shaped head and a second opening spaced from said first opening, a locking aperture in said first arm of said yoke positioned for alignment with said second opening in said locking plate when said locking plate is placed over said shaped head, and locking pin means adapted to pass through said second opening and said locking aperture when aligned to secure said locking plate and said bar member against rotation with respect to said yoke and to maintain the tension in said belt; and means secured to said depending leg of said yoke and serving to facilitate securing of said yoke in the ground and to prevent withdrawal thereof by forces directed axially along said leg.

* * * * *